(12) United States Patent
Inoue (10) Patent No.: US 9,995,395 B2
(45) Date of Patent: Jun. 12, 2018

(54) BRUSH SEAL

(71) Applicant: EAGLE INDUSTRY CO., LTD., Minato-ku, Tokyo (JP)

(72) Inventor: Hideyuki Inoue, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 246 days.

(21) Appl. No.: 14/380,904

(22) PCT Filed: Feb. 28, 2013

(86) PCT No.: PCT/JP2013/055317
§ 371 (c)(1),
(2) Date: Aug. 25, 2014

(87) PCT Pub. No.: WO2013/153868
PCT Pub. Date: Oct. 17, 2013

(65) Prior Publication Data
US 2015/0014939 A1 Jan. 15, 2015

(30) Foreign Application Priority Data
Apr. 8, 2012 (JP) ................. 2012-088000

(51) Int. Cl.
*F16J 15/22* (2006.01)
*F02C 7/28* (2006.01)
(Continued)

(52) U.S. Cl.
CPC ............. *F16J 15/22* (2013.01); *F01D 11/001* (2013.01); *F01D 11/003* (2013.01); *F01D 11/12* (2013.01);
(Continued)

(58) Field of Classification Search
CPC ... F16J 15/3284; F16J 15/3288; F16J 15/3292
See application file for complete search history.

(56) References Cited

U.S. PATENT DOCUMENTS 885,032 A * 4/1908 Ferranti .................. F01D 5/225
 277/355
4,682,933 A * 7/1987 Wagner .................... F01D 5/20
 415/173.5
(Continued)

FOREIGN PATENT DOCUMENTS

CN 101506553 8/2009 ............. F01D 11/00
CN 101793169 A 8/2010
(Continued)

OTHER PUBLICATIONS

A Second Notification of Reason for Refusal with Search Report issued by the State Intellectual Property Office of China dated May 4, 2016 for Chinese counterpart application No. 201380009242.0.
(Continued)

*Primary Examiner* — Vishal A Patel
(74) *Attorney, Agent, or Firm* — Hayes Soloway P.C.

(57) ABSTRACT

A brush seal includes a bristle part formed by multiple bristles attached to a stationary part between the stationary part and a rotational part that undergo relative motion by maintaining a space in between and a back plate to restrict the movement of the bristle part. Such brush seal for sealing a fluid between the stationary part and the rotational part includes the bristle part formed by the multiple bristles such that the multiple bristles arranged in a direction of pressure difference between the high-pressure side and the low-pressure side are mutually fixed between a base end and a free end to form planar bristles, and these planar bristles are arranged continuously in layers in a circumferential direction to form a circular bristle part, wherein circumferential grooves are formed on the sliding surface of the bristle part on its free end side.

3 Claims, 3 Drawing Sheets

(51) Int. Cl.
*F01D 11/00* (2006.01)
*F16J 15/3288* (2016.01)
*F01D 11/12* (2006.01)

(52) U.S. Cl.
CPC ............ *F02C 7/28* (2013.01); *F16J 15/3288* (2013.01); *F05D 2240/56* (2013.01)

(56) References Cited

U.S. PATENT DOCUMENTS

| | | | | |
|---|---|---|---|---|
| 5,066,024 | A | * | 11/1991 | Reisinger ............ F16J 15/3288 277/355 |
| 5,108,116 | A | * | 4/1992 | Johnson ............... F16J 15/3288 277/355 |
| 5,201,530 | A | | 4/1993 | Kelch et al. |
| 5,318,309 | A | * | 6/1994 | Tseng ..................... F01D 11/02 277/347 |
| 5,335,920 | A | * | 8/1994 | Tseng ................... F16J 15/3288 277/303 |
| 5,480,165 | A | | 1/1996 | Flower |
| 5,755,445 | A | * | 5/1998 | Arora ................... F01D 11/005 277/418 |
| 5,975,535 | A | * | 11/1999 | Gail ..................... F16J 15/3288 277/355 |
| 6,343,792 | B1 | * | 2/2002 | Shinohara ............. F01D 11/001 277/345 |
| 6,436,099 | B1 | * | 8/2002 | Drewry .............. A61B 17/7022 606/300 |
| 7,004,475 | B2 | * | 2/2006 | McHale ................. F16J 15/442 277/411 |
| 7,028,510 | B1 | * | 4/2006 | DaRosa ................. D04B 21/20 66/170 |
| 8,074,995 | B2 | * | 12/2011 | Vasagar ............... F16J 15/3244 277/301 |
| 8,459,652 | B2 | | 6/2013 | Brueck et al. ................ 277/355 |
| 2003/0001339 | A1 | | 1/2003 | Inoue |
| 2003/0094848 | A1 | | 5/2003 | Shia et al. |
| 2003/0151206 | A1 | * | 8/2003 | Smith ...................... A46B 3/02 277/355 |
| 2007/0018408 | A1 | * | 1/2007 | Kono .................. F16J 15/3292 277/355 |
| 2010/0068042 | A1 | * | 3/2010 | Bruck .................. F16J 15/3288 415/174.2 |
| 2011/0227289 | A1 | * | 9/2011 | Stefan .................. F16J 15/3288 277/355 |
| 2012/0003084 | A1 | * | 1/2012 | Matwey ................... F01D 11/02 415/198.1 |
| 2012/0201565 | A1 | | 8/2012 | Shoji et al. |
| 2013/0001883 | A1 | * | 1/2013 | Addis .................. F16J 15/3288 277/355 |
| 2015/0001809 | A1 | * | 1/2015 | Franceschini ........ F16J 15/3288 277/355 |
| 2015/0323077 | A1 | * | 11/2015 | Franceschini ........ F16J 15/3292 277/355 |

FOREIGN PATENT DOCUMENTS

| | | |
|---|---|---|
| EP | 1052438 A2 | 11/2000 |
| JP | 2001-073708 A | 3/2001 |
| JP | 2003-014128 A | 1/2003 |
| JP | 2003343730 A | 12/2003 |
| JP | 2008-121512 A | 5/2008 |
| JP | 2010-500916 A | 1/2010 |
| JP | 2011-094803 A | 5/2011 |
| WO | 2011/018948 A1 | 2/2011 |

OTHER PUBLICATIONS

Chinese Office Action (w/translation) issued in application No. 201610828628.X, dated Dec. 22, 2017 (8 pgs).

* cited by examiner

FIG. 1

Low-pressure side    High-pressure side (sealed fluid side)

BRUSH SEAL

This application is the U.S. National Phase under 35 U.S.C. § 371 of International Application PCT/JP2013/055317, filed Feb. 28, 2013, which claims priority to Japanese Patent Application No. 2012-088000, filed Apr. 8, 2012. The International Application was published under PCT Article 21(2) in a language other than English.

TECHNICAL FIELD

The present invention relates to a brush seal for providing a seal between a rotational axis and its mating part that undergo relative motion in an airplane, gas turbine, steam turbine, etc., for example.

BACKGROUND ART

Sealing mechanisms are provided around a rotational axis in a gas turbine to prevent gas from leaking to the low-pressure side from the high-pressure side, for example.

Labyrinth seals, which are non-contact seals, have traditionally been used for these sealing mechanisms, but as labyrinth seals make no contact, there are limits to how much their sealing performance can be improved. Accordingly, brush seals are now being used to achieve greater sealing performance.

A brush seal comprises multiple bristles formed into a ring shape (brush seal bristles), and the tips of these brush seal bristles contact the rotating side to provide a seal.

The rotating side, such as a rotor in a gas turbine, deforms due to centrifugal force and heat as the turbine operates, while the housing, which is the stationary side, also expands due to heat, and consequently the distance between the brush seal and rotor changes.

This distance change is absorbed by the deflection of bristles, but since deflection of bristles toward the low-pressure side can cause the sealing performance to drop, a back plate is provided on the low-pressure side of brush seal bristles to prevent them from deflecting toward the low-pressure side. Additionally, a space is provided on the high-pressure side of bristles to allow for deflection of bristles. (Refer to FIGS. 8 to 10 on Page 10 of Patent Literature 1, for example.)

If a brush seal is used in a high-pressure area in a steam turbine, etc., however, its bristles will flap, especially on the high-pressure side, and eventually break.

If bristles break, the broken bristles will no longer contact the rotor, thereby causing the sealing performance of the brush seal to drop.

A drop in the sealing performance of the brush seal can lead to a problem of lower output from the turbine, for example.

To eliminate the flapping of bristles on the high-pressure side, solutions are proposed that involve providing a braking plate also on the high-pressure side of brush seal bristles to restrict the deflection of brush seal bristles, while providing through holes in the braking plate to suppress generation of turbulent flows and particularly prevent the bristles from flapping on the high-pressure side. (Refer to Patent Literature 2, for example.)

However, the solution described in Patent Literature 2 is such that the movement of brush seal bristles is strongly restricted all the way until near the rotor by the back plate on the low-pressure side and braking plate on the high-pressure side, resulting in a shorter free deflection length of brush seal bristles.

This increases the rigidity of brush seal bristles and raises their contact pressure with the rotor, which in turn presents a problem of increased wear of the bristles and rotor in a steady state.

To solve the problems of the solution described in Patent Literature 2, solutions are proposed that involve providing restraining bristles having just enough elasticity not to prevent the deformation of the bristle part upon contact, in place of a braking plate on the high-pressure side of bristles. (Refer to Patent Literature 3, for example.)

The brush seal described in Patent Literature 3 absorbs any change in the interval between the stationary part and the rotational part by the deflection of the bristle part, and because the movement of the bristle part is suppressed by the back plate on the low-pressure side, these bristles deflect in the direction of the restraining bristles; since the restraining bristles have just enough elasticity not to prevent the deformation of the bristle part upon contact; the restraining bristles undergo elastic deformation and thereby absorb the deformation of the bristle part, and consequently any increase in wear can be prevented in a steady state without increasing the contact friction force as the interval between the stationary part and rotational part changes.

However, the brush seal described in Patent Literature 3 presents a problem of high manufacturing cost because restraining bristles formed by bundled wires (bristles) must be provided on the high-pressure side of the bristle part.

PRIOR ART LITERATURES

Patent Literatures

{Patent Literature 1} Japanese Patent Laid-open No. 2003-14128 (FIG. 8 on Page 10)
{Patent Literature 2} Japanese Patent Laid-open No. 2001-73708
{Patent Literature 3} Japanese Patent Laid-open No. 2008-121512

SUMMARY OF INVENTION

Problems to be Solved by Invention

The present invention was developed to solve the aforementioned problems of prior arts and the object of the present invention is to provide a brush seal of simple configuration that increases the rigidity of bristles in the direction of pressure difference between the high-pressure side and low-pressure side, while decreasing the rigidity in the direction orthogonal to the direction of pressure difference and thereby reducing the wear of bristles, and also reduces the leakage of sealed fluid.

Means to Solve Problems

To achieve the aforementioned object, firstly, the brush seal proposed by the present invention is a brush seal having: a bristle part formed by multiple bristles attached to a stationary part between the stationary part and a rotational part that undergo relative motion by maintaining a space in between; and a back plate attached adjacent to the bristle part on a low-pressure side to restrict the movement of the bristle part, wherein such brush seal of sealing fluid flowing between the stationary part and the rotational part is characterized in that the bristle part formed by multiple bristles is such that the multiple bristles arranged in the direction of pressure difference between the high-pressure side and low-pressure side are mutually fixed between the base end and free end to form planar bristles and these planar bristles are arranged continuously in layers in the circumferential direction to form the circular bristle part, and that circumferential grooves are formed on the sliding surface on the free end side of the bristle part.

According to these characteristics, this brush seal provides higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, since degrees of freedom of the tips of bristles are ensured in the direction orthogonal to the direction of pressure difference (=circumferential direction), their rigidity is low in the direction orthogonal to the direction of pressure difference and therefore the free end can separate from the outer periphery surface of the rotational part due to the dynamic pressure of the rotational part even when it is rotating at low speed, resulting in reduced wear and improved wear resistance.

Furthermore, the ability of the tips of bristles to move independently of the conical vibration of the rotational part (=vibration generated by the tilting of the axis) also helps to reduce wear and improve wear resistance.

In addition, since circumferential grooves are formed on the sliding surface to create a labyrinth seal structure, fluid leaking from the high-pressure side toward the low-pressure side undergoes sequential pressure drops to eventually become low-pressured, and consequently the amount of fluid leaking from the high-pressure side toward the low-pressure side is suppressed.

Secondly, the brush seal proposed by the present invention is characterized in that, in the first characteristics, the circumferential grooves are formed by arranging, among the multiple bristles arranged in the direction of pressure difference between the high-pressure side and low-pressure side, bristles whose height is shorter on the free end side on the interior side in locations not facing the high-pressure side or low-pressure side, and then arranging the resulting planar bristles continuously in layers in the circumferential direction.

According to these characteristics, the circumferential grooves can be formed with ease by arranging bristles of different heights.

Thirdly, the brush seal proposed by the present invention is characterized in that, in addition to the first or second characteristics, dams are formed in the middle of the circumferential grooves in the circumferential direction.

According to these characteristics, the hydrodynamic force generated by the swirling flows that in turn are generated by the rotation of the rotational part contacts the side faces of the bristles constituting the dams to generate buoyancy in the bristles, thereby reducing the amount of wear of bristles further.

Effects of Invention

The invention described in the present application for patent provides higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, since degrees of freedom of the tips of bristles are ensured in the direction orthogonal to the direction of pressure difference (=circumferential direction), their rigidity is low in the direction orthogonal to the direction of pressure difference and therefore the free end can separate from the outer periphery surface of the rotational part due to the dynamic pressure of the rotational part even when it is rotating at low speed, resulting in reduced wear and improved wear resistance.

Furthermore, the ability of the tips of bristles to move independently of the conical vibration of the rotational part also helps to reduce wear and improve wear resistance.

In addition, since circumferential grooves are formed on the sliding surface to create a labyrinth seal structure, fluid leaking from the high-pressure side toward the low-pressure side undergoes sequential pressure drops to eventually become low-pressured, and consequently the amount of fluid leaking from the high-pressure side toward the low-pressure side is suppressed.

Furthermore, the hydrodynamic force generated by the swirling flows that in turn are generated by the rotation of the rotational part contacts the side faces of the bristles constituting the dams to generate buoyancy in the bristles, thereby reducing the amount of wear of bristles further.

MODES FOR CARRYING OUT THE INVENTION

Modes for carrying out a brush seal pertaining to the present invention are explained in detail by referring to the drawings, but it should be noted that the present invention is not at all restricted to these interpretations and various changes, modifications and improvements can be added according to the knowledge of those skilled in the art so long as they do not deviate from the scope of the present invention.

Figure 1:
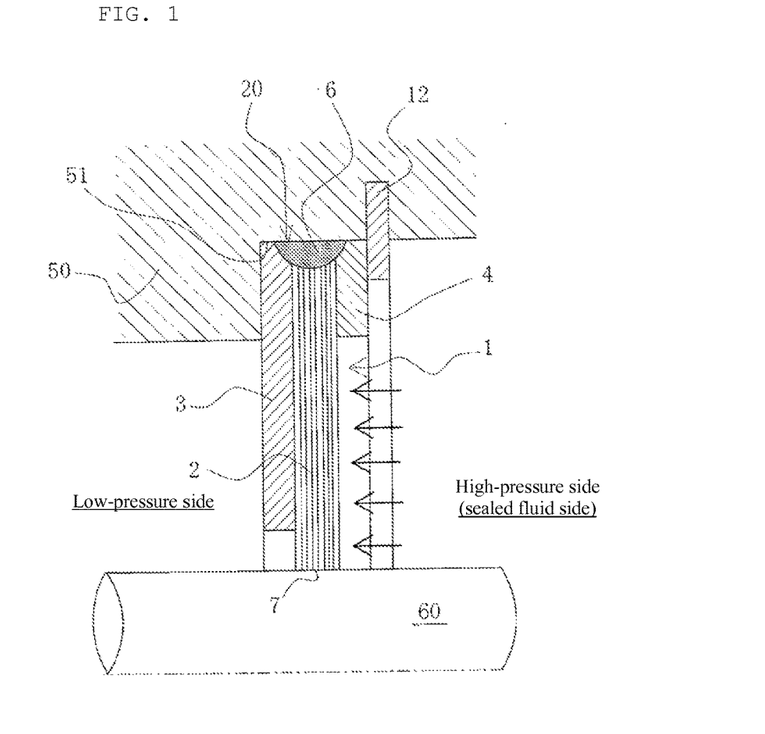
FIG. 1 is a longitudinal section view showing the top half of a brush seal pertaining to an embodiment of the present invention

FIG. 1 is a longitudinal section view showing the top half of a brush seal pertaining to an embodiment of the present invention In FIG. 1, a brush seal device 1 is formed in a ring shape and its fixed part 20 on the outer periphery side is attached, via a snap ring 12, to a step 51 provided on the inner periphery surface of a casing 50 which is a component of one section of the constituent components.

Also, the inner periphery side of the brush seal device 1 is provided in a manner opposingly contacting or positioned close to the outer periphery surface of a rotor 60 which is a component of the other section, and the brush seal device 1 seals the leakage of the sealed fluid to the low-pressure side from the high-pressure side.

Note that the casing 50 constitutes the stationary part of the present invention, while the rotor 60 constitutes the rotational part of the present invention.

On the low-pressure side of a bristle part 2 which is a key component member of this brush seal device 1, a circular back plate 3 is provided in contact with the bristle part 2 and which supports the bristle part 2 against the pressure of the sealed fluid acting upon it.

On the surface of the bristle part 2 on the high-pressure side, a retention part 4 is formed as a ring plate and positioned integrally with the back plate 3 so as to sandwich a base end 6 of the bristle part 2 on the outer periphery side between itself and the back plate 3. This retention part 4 is tapered widthwise in the diameter direction to expose the bristle part 2 so that the sealed fluid can act upon the side faces of the bristle part 2.

Also, the back plate 3 and the base end 6 and retention part 4 of the bristle part 2 are welded to the outer periphery to constitute the fixed part 20, which is fixed to the step 51 provided on the inner periphery surface of the casing 50.

The bristle part 2 is formed by tens to hundreds of thousands of bristles (coarse hairs) 5 arranged from the outer periphery side toward the inner periphery side, where multiple bristles are arranged in the direction of pressure difference between the high-pressure side and low-pressure side to form a specified width, while multiple bristles 5 forming a specified width are also arranged continuously in the circumferential direction in a circular shape.

In addition, a free end 7 of the bristles 5 on the inner periphery side is provided in a manner opposingly contacting or positioned close to the outer periphery surface of the rotor 60 which is the other component.

The wire diameter of bristles 5 is generally 0.02 mm to 0.5 mm. For the material of bristles 5, steel, stainless steel or nickel alloy, heat-resistant cobalt alloy, or the like, is used. Additionally, the cross-section shape of bristles 5 may be oval, triangle, square, or other polygon, in addition to circle.

Figure 2:
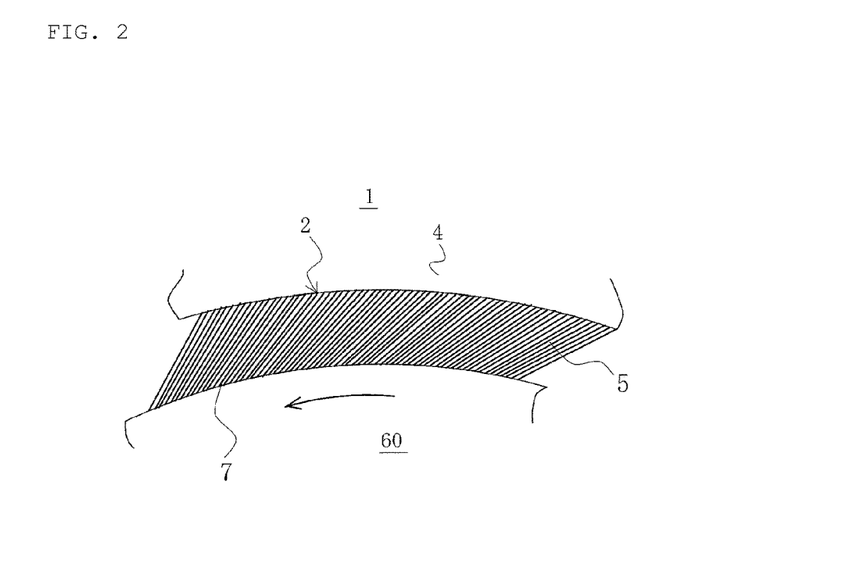
FIG. 2 is a front view of the brush seal in FIG. 1 as viewed from the high-pressure side

FIG. 2 is a front view of the brush seal in FIG. 1 as viewed from the high-pressure side.

The brush seal 1 in FIG. 2 is in a normal state where the brush seal 1 and rotor 60 are not shaking, and its bristles 5 are arranged straight in a manner tilting in the rotating direction of the rotor 60. In this normal state of the brush seal 1, the free end 7 of the bristles 5 is contacting or positioned close to the outer periphery surface of the rotor 60.

Figure 3:
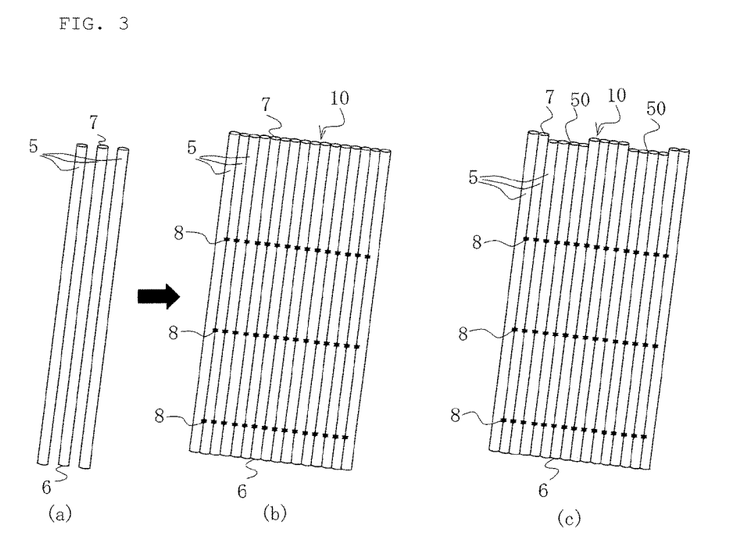
FIG. 3 is a perspective view explaining the process of forming a bristle part pertaining to an embodiment of the present invention

FIG. 3 is a perspective view explaining the process of forming a bristle part pertaining to an embodiment of the present invention, where circumferential grooves are not formed on the sliding surface of the bristle part in (a) and (b), while circumferential grooves are formed on the sliding surface of the bristle part in (c).

Note that the top side of FIG. 3 represents the free end side of the bristle part that slides with the rotational part, while the bottom side represents the base end side (stationary part side).

In FIG. 3, for the purpose of illustration, the number of bristles arranged in the direction of pressure difference between the high-pressure side and low-pressure side is less than the actual number, but in reality hundreds of bristles are arranged to form a specified width.

As shown in FIG. 3 (*a*), multiple bristles 5 having a circular cross-section shape and specified length are prepared. Next, the multiple bristles 5 are arranged in a single row in such a way that a specified width is formed in the direction of pressure difference between the high-pressure side and low-pressure side and that the bristles 5 positioned side by side contact each other, as shown in FIG. 3 (*b*). Then, the bristles 5 positioned side by side are fixed by means of welding, fusion, etc., between the base end 6 and free end 7.

In FIG. 3 (*b*), three fixed parts 8 are provided in the diameter direction between the base end 6 and free end 7. However, the number of fixed parts 8 in the diameter direction is not at all restricted to three, as long as at least one fixed part is provided, and any location (s) and number of fixed part (s) can be set according to the required rigidity of the bristle part 2. Among the fixed parts 8, the position of the fixed part 8 close to the free end 7 is important in determining the rigidity at the free end of bristles 5.

As described above, the multiple bristles 5 mutually fixed at the center in the diameter direction are formed in a planar shape to form planar bristles 10, as shown in FIG. 3 (*b*).

The planar bristles 10 shown in FIG. 3 (*c*) are such that, among the multiple bristles 5 forming a specified width, bristles 50 whose height is short on the free end side are arranged on the interior side in locations not contacting the high-pressure side or low-pressure side. FIG. 3 (*c*) shows two independent locations, in the direction of pressure difference between the high-pressure side and low-pressure side, where short bristles 50 are arranged over a specified width. The number of locations where short bristles 50 are arranged is not at all restricted to two, and it can be one or three or more.

Methods to lower the heights of some bristles on the free end side include, among others, a method to form planar bristles 10 by arranging bristles of the same height and then cutting the bristles in specified positions on the free end side, as shown in FIG. 3 (*b*), and a method to prepare short bristles 50 beforehand and, when arranging multiple bristles in a single row, arrange the short bristles 50 in specified positions and then fix the bristles positioned side by side.

The aforementioned planar bristles 10 are arranged continuously in layers in the circumferential direction with the bristles 5 contacting or positioned close to the outer periphery surface of the rotor 60 at the free end 7, to form the circular bristle part 2 shown in FIG. 2.

The planar bristles 10 thus formed provide higher rigidity in the direction of pressure difference between the high-pressure side and low-pressure side (=axial direction of the rotor) compared to when conventionally known brush seal bristles are used, and thus can be applied to steam turbines and other high-pressure equipment.

Additionally, the planar bristles 10 are such that, since degrees of freedom of the tips of individual bristles 5, or specifically degrees of freedom of the tips of individual bristles 5 in the direction orthogonal to the direction of pressure difference (=circumferential direction) between the fixed part 8 close to the free end 7 and the free end 7, are ensured, their rigidity is low in the direction orthogonal to the direction of pressure difference and therefore the free end 7 can separate from the outer periphery surface of the rotor 60 due to the dynamic pressure of the rotor 60 even when it is rotating at low speed, resulting in such advantages as reduced wear and improved wear resistance.

Furthermore, the ability of the tips of individual bristles 5 to move independently of the conical vibration of the rotor 60 also helps to reduce wear and improve wear resistance.

Embodiment 1

Figure 4:
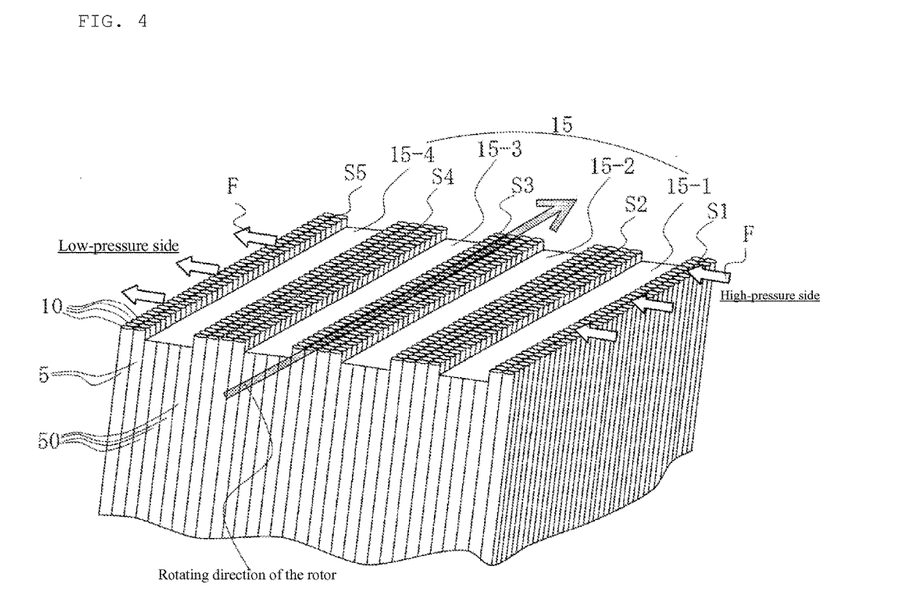
FIG. 4 is a perspective view explaining the circumferential grooves provided on the sliding surface of a bristle part pertaining to Embodiment 1 of the present invention

Next, the circumferential grooves provided on the sliding surface of a bristle part pertaining to Embodiment 1 of the present invention is explained by referring to FIG. 4. In FIG. 4, the top side of the drawing represents the free end side of bristles that slide with the rotational part, while the bottom side represents the base end side (stationary part side). Also note that the direction connecting the front left and rear right of the drawing represents the circumferential direction. Furthermore, the right side of the drawing represents the high-pressure side, while the left side represents the low-pressure side.

In FIG. 4, multiple planar bristles 10 of the same shape, having multiple independently formed grooves comprising short bristles 50 arranged over a specified width in the direction of pressure difference between the high-pressure side and low-pressure side, are provided in locations on the interior side not contacting the high-pressure side or low-pressure side and arranged in the circumferential direction.

Here, the circumferential grooves 15 are formed by continuously arranging in layers in the circumferential direction the planar bristles 10 that have, among the multiple bristles 5 arranged in the direction of pressure difference between the high-pressure side and low-pressure side, bristles 50 whose height is short over a specified width in the direction of pressure difference between the high-pressure side and low-pressure side, and in FIG. 4, circumferential grooves 15 are formed independently at four locations in the direction of pressure difference between the high-pressure side and low-pressure side, as indicated by 15-1 to 15-4. These circumferential grooves 15-1 to 15-4 are formed along the rotating direction of the rotor 60 in locations on the interior side not contacting the high-pressure side or low-pressure side. Herein, the aforementioned "specified width" refers to the width needed by the fluid leaking from the high-pressure side toward the low-pressure side as it undergoes adiabatic expansion.

The sliding surface on which the circumferential grooves 15-1 to 15-4 are formed has a labyrinth seal structure having multiple constrictions, and the fluid F, indicated by arrows, that leaks from the high-pressure side toward the low-pressure side is constricted at a first constriction S1 on the high-pressure side and receives resistance, after which it undergoes adiabatic expansion at the circumferential groove 15-1 and drops in pressure and then is constricted at a second constriction S2 and receives resistance, after which it undergoes adiabatic expansion at the circumferential groove 15-2, and after going through repeated pressure drops until at a constriction S5 in the same manner, the fluid eventually becomes low-pressured. As a result, the amount of fluid leaking from the high-pressure side toward the low-pressure side is suppressed.

The number of circumferential grooves 15 provided in the direction of pressure difference between the high-pressure side and low-pressure side is set as deemed appropriate according to the pressurization condition, type of sealed fluid, and so on.

Embodiment 2

Figure 5:
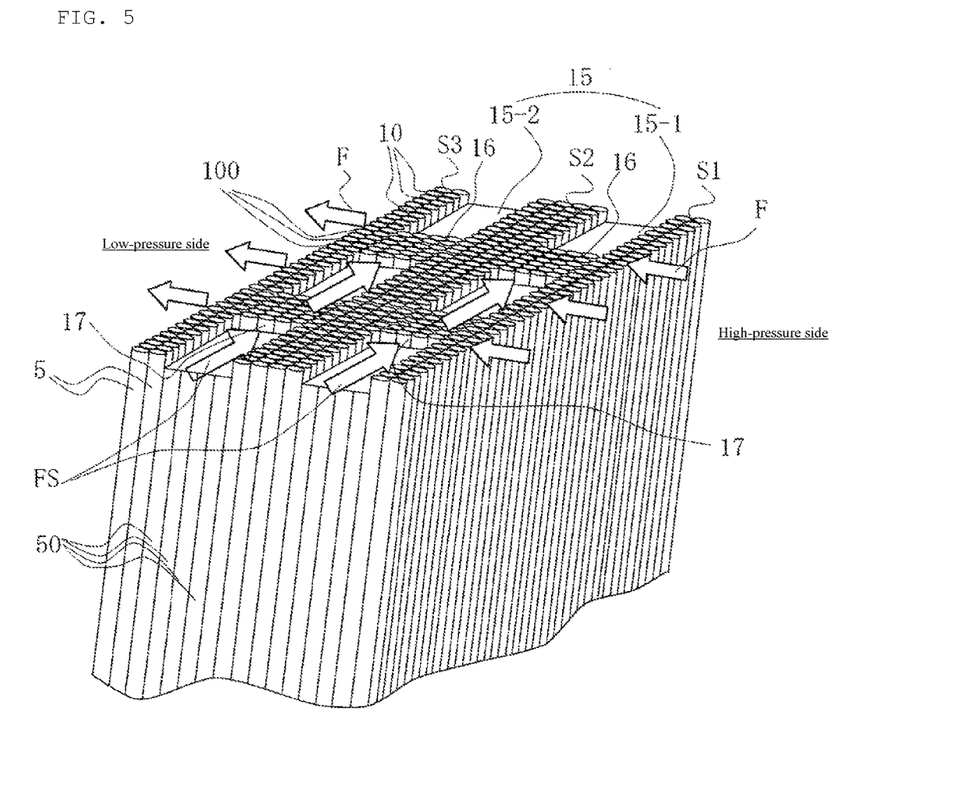
FIG. 5 is a perspective view explaining the circumferential grooves provided on the sliding surface of a bristle part pertaining to Embodiment 2 of the present invention

Next, the circumferential grooves provided on the sliding surface of a bristle part pertaining to Embodiment 2 of the present invention are explained by referring to FIG. 5. In FIG. 5, the top side of the drawing represents the free end side of bristles that slide with the rotational part, while the bottom side represents the base end side (stationary part side). Also note that the direction connecting the front left and rear right of the drawing represents the circumferential direction. Furthermore, the right side of the drawing represents the high-pressure side, while the left side represents the low-pressure side.

Embodiment 2 in FIG. 5 is different from Embodiment 1 in FIG. 4 in that circumferential grooves are provided at two locations and that dams are formed in the middle of the circumferential grooves in the circumferential direction, but since the remainder of the configuration is the same as with Embodiment 1 in FIG. 4, the same symbols are used for those members identical to the corresponding members in FIG. 4 and redundant explanations are omitted.

In FIG. 5, multiple planar bristles 10 of the same shape, having multiple independently formed grooves comprising short bristles 50 arranged over a specified width in the direction of pressure difference between the high-pressure side and low-pressure side, are provided in locations on the interior side not contacting the high-pressure side or low-pressure side and arranged in the circumferential direction, where planar bristles 100 of the same shape, having tall bristles 5 arranged over the entire width in the direction of pressure difference between the high-pressure side and low-pressure side, are placed in the middle in the circumferential direction over a specified length in the circumferential direction. Here, the "specified length in the circumferential direction" refers to the length needed to holdback the flow of fluid in the circumferential direction being generated by the rotation of the rotor 60.

The circumferential grooves 15 are formed by continuously arranging in layers in the circumferential direction the planar bristles 10 that have, among the multiple bristles 5 arranged in the direction of pressure difference between the high-pressure side and low-pressure side, bristles 50 whose height is short over a specified width in the direction of pressure difference between the high-pressure side and low-pressure side, and in FIG. 5, circumferential grooves 15 are formed independently at two locations in the direction of pressure difference between the high-pressure side and low-pressure side, as indicated by 15-1 and 15-2. These circumferential grooves 15-1, 15-2 are formed along the rotating direction of the rotor 60 in locations on the interior side not contacting the high-pressure side or low-pressure side. Additionally, dams, 16, 16 are formed in the middle of the respective circumferential grooves 15-1, 15-2 in the circumferential direction as a result of planar bristles 100 being placed over a specified length in the circumferential direction. At least one dam 16 is provided in each of the circumferential grooves 15-1, 15-2 in the circumferential direction, and normally multiple dams are provided at equal distributions. Also in FIG. 5, dams 16, 16 are provided in the two circumferential grooves 15, 15 at the same positions in the circumferential direction. However, the positions of dams are not at all restricted to the foregoing, and they may be provided at positions offset in the circumferential direction.

The sliding surface on which the circumferential grooves 15-1, 15-2 are formed have a labyrinth seal structure having multiple constrictions, and the fluid, indicated by arrows F, that leaks from the high-pressure side toward the low-pressure side is constricted at a first constriction S1 on the high-pressure side and receives resistance, after which it undergoes adiabatic expansion at the circumferential groove 15-1 and drops in pressure and then is constricted at a second constriction S2 and receives resistance, after which it undergoes adiabatic expansion at the circumferential groove 15-2, and after going through repeated pressure drops until at a constriction S3 in the same manner, the fluid eventually becomes low-pressured. As a result, the amount of fluid leaking from the high-pressure side toward the low-pressure side is suppressed.

In addition, the dams 16, 16 provided in the middle of the circumferential grooves 15-1, 15-2 are such that the hydrodynamic force generated by the swirling flows indicated by arrows FS that in turn are generated by the rotation of the rotor 60 contacts the side faces 17, 17 of the bristles 5 constituting the dams 16, 16 to generate buoyancy in the bristles 5, thereby reducing the amount of wear of bristles 5.

Figure 6:
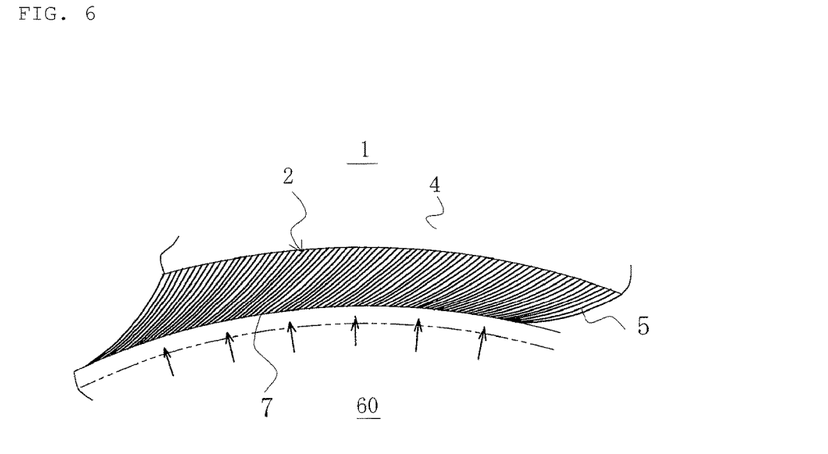
FIG. 6 is a front view of the brush seal in FIG. 1 with its rotational part eccentrically shifted, as viewed from the high-pressure side

FIG. 6 is a front view of the brush seal in FIG. 1 with its rotational part eccentrically shifted, as viewed from the high-pressure side.

The brush seal 1 is such that, as the rotor 60 turns and contacts the free end 7 of bristle 5 as a result of vibration, shaking, etc., the bristle 5 tilts more while being pressed against the rotor 60. Here, since degrees of freedom of the tip of individual bristle 5 are ensured in the direction orthogonal to the direction of pressure difference, their rigidity is low in the direction orthogonal to the direction of pressure difference and therefore the free end 7 can separate from the outer periphery surface of the rotor 60 due to the dynamic pressure of the rotor 60 even when it is rotating at low speed, resulting in such advantages as reduced wear and improved wear resistance. Furthermore, the ability of the individual bristles 5, 15 to move independently of the conical vibration of the rotor 60 also helps to reduce wear and improve wear resistance.

Furthermore, since the sliding surface on the free end 7 side of the circular bristle part 2 has circumferential grooves 15 formed on it in locations on the interior side not contacting the high-pressure side or low-pressure side to create a labyrinth seal structure, and therefore the fluid F that leaks from the high-pressure side toward the low-pressure side undergoes repeated pressure drops and eventually becomes low-pressured, the amount of fluid leaking from the high-pressure side toward the low-pressure side is suppressed as a result.

Furthermore, the dam 16 provided in the middle of the circumferential groove 15 is such that the hydrodynamic force generated by the swirling flows FS that in turn are generated by the rotation of the rotor 60 contacts the side faces of the bristles 5 constituting the dams 16 to generate buoyancy in the bristles 5, thereby reducing the amount of wear of bristles 5 further.

The operations and effects of brush seals pertaining to the embodiments of the present invention are summarized as follows.

Since multiple bristles arranged in the direction of pressure difference between the high-pressure side and low-pressure side are mutually fixed between the base end and free end to be formed into planar bristles, rigidity is higher in the direction of pressure difference between the high-pressure side and low-pressure side (=axial direction of the rotor) compared to when conventionally known brush seal bristles are used, and consequently application to steam turbines and other high-pressure equipment becomes possible.

In addition, the planar bristles 10 are ensured of degrees of freedom in the direction orthogonal to the direction of pressure difference (=circumferential direction) at the tips of individual bristles 5, or specifically at the tips of individual bristles 5 between the fixed part 8 close to the free end 7 and the free end 7, and thus have low rigidity in the direction orthogonal to the direction of pressure difference, and therefore the free end 7 can separate from the outer periphery surface of the rotor 60 due to the dynamic pressure of the rotor 60 even when it is rotating at low speed, which provides such benefits as reduced wear and improved wear resistance.

Furthermore, the ability of the tips of individual bristles 5 to move independently of the conical vibration of the rotor 60 also helps to reduce wear and improve wear resistance.

Moreover, since circumferential grooves 15 are formed on the sliding surface on the free end 7 side of the circular bristle part 2 to create a labyrinth seal structure, the fluid F that leaks from the high-pressure side toward the low-pressure side undergoes repeated pressure drops and eventually becomes low-pressured, thereby suppressing the amount of fluid leaking from the high-pressure side toward the low-pressure side.

Also, the circumferential grooves 15 are formed by continuously arranging in layers in the circumferential direction the planar bristles 10 that have, among the multiple bristles 5 arranged in the direction of pressure difference between the high-pressure side and low-pressure side, bristles 50 whose height is short on the free end side in locations on the interior side not contacting the high-pressure side or low-pressure side, which means that the circumferential grooves can be formed with ease by arranging bristles of different heights.

Furthermore, the dam 16 provided in the middle of the circumferential groove 15 is such that the hydrodynamic force generated by the swirling flows FS that in turn are generated by the rotation of the rotor 60 contacts the side faces 17 of the bristles 5 constituting the dams 16 to generate buoyancy in the bristles 5, thereby further reducing the amount of wear of bristles 5.

The foregoing explained the embodiments of the present invention using drawings, but it should be noted that the specific constitutions are not at all restricted to these embodiments and changes and additions are also included in the present invention so long as they do not deviate from the purpose of the present invention.

For instance, the embodiments explained bristles having a circular or square cross-section shape, but the bristles are not at all restricted to the foregoing and bristles having a triangle, polygonal, oval, or other cross-section shape can also be used.

In addition, the embodiments explained a case where the bristles positioned side by side are fixed at three locations in the diameter direction between the base end and free end of multiple bristles arranged in a single row, for instance, but the fixed parts are not at all restricted to the foregoing and other variations are also permitted as long as there is at least one fixed location. It is also possible to change the fixed position for each of the planar bristles arranged in the circumferential direction, to prevent fixed positions from concentrating at one location in the diameter direction.

Also, the embodiments explained a method to form circumferential grooves by continuously arranging in layers in the circumferential direction the planar bristles that have, among the multiple bristles arranged in the direction of pressure difference between the high-pressure side and low-pressure side, bristles whose height is short over a specified width in the direction of pressure difference between the high-pressure side and low-pressure side, for instance, but the method to form circumferential grooves is not at all limited to the foregoing and circumferential grooves can be formed by forming a circular bristle part and then irradiating laser onto the sliding surface, or the like.

In addition, Embodiment 2 explained a method to form dams by inserting over a specified length in the circumferential direction those planar bristles of the same shape having higher bristles arranged in the middle in the circumferential direction over the entire width in the direction of pressure difference between the high-pressure side and low-pressure side, for instance, but the method to form dams is not at all restricted to the foregoing and dams can be formed simultaneously when circumferential grooves are formed by forming a circular bristle part and then irradiating laser onto the sliding surface, or the like.

REFERENCE SIGNS

1 Brush seal device
2 Bristle part
3 Back plate
4 Retention part
5 Bristle
6 Base end
7 Free end
8 Fixed part
10 Planar bristle
12 Snap ring
15 Circumferential groove
16 Dam
17 Side face of the bristle
20 Fixed part
50 Casing (stationary part)
51 Step
60 Rotor (rotational part)
F Leaking fluid
FS Swirling flow
S1 to S5 Constriction

The invention claimed is:

1. A brush seal for providing a fluid seal between a rotational part and a stationary part, having:
a bristle part formed by multiple bristles consisting of straight bristles having base ends attached to the stationary part between the stationary part and free ends adjacent the rotational part that undergo relative motion by maintaining a space in between; and
a back plate attached adjacent to the bristle part on a low-pressure side of the bristle part to restrict movement of the bristle part,
wherein:
the bristle part is formed by multiple planar bristles fixed to one another between their respective base ends and free ends, each planar bristle being discretely formed by multiple straight bristles such that multiple straight bristles are:
(i) arranged in a single row in a direction of pressure difference between a high-pressure side and the low-pressure side in a manner that the straight bristles positioned side by side contact each other, and
(ii) mutually welded or fused at multiple locations between the base end and the free end of the straight bristles, apart from the base end, wherein a high-pressure side face of each planar bristle is exposed to the sealed fluid which acts on the high-pressure side face of the planar bristle in the direction of pressure difference so as to form each planar bristle in the direction of pressure differences, and
the multiple planar bristles are arranged continuously in layers in a circumferential direction to form a circular bristle part, wherein circumferential grooves are formed on a sliding surface of the bristle part on the free end side, the bristle part includes side bristles positioned nearest the high-pressure side whose length is long so as to be brought into contact with the rotational part and side bristles positioned nearest the low-pressure side whose length is long so as to be brought into contact with the rotational part, and the circumferential grooves include at least one circumferential groove which is discontinuous in the circumferential direction owing to dams formed by the bristles whose length is long on the free end so as to be brought into contact with the rotational part.

2. A brush seal according to claim 1, wherein the circumferential grooves are formed by continuously arranging in layers in the circumferential direction the planar bristles each formed by the multiple straight bristles that are arranged in the single row in the manner that the straight bristles positioned side by side contact each other, and that are mutually fixed at the multiple locations between the base end and the free end, wherein the planar bristles have, among the multiple straight bristles arranged in the direction of pressure difference between the high-pressure side and low-pressure side, bristles whose height is short on the free end side in locations on an interior side not facing the high-pressure side or low-pressure side.

3. A brush seal according to claim 1, wherein
the bristle part includes at least one planar bristle which is constituted by part of the side bristles positioned nearest the high pressure side, the side bristles positioned nearest the low pressure side, and the bristles forming the dams and extends over a whole width of the bristle part in the direction of pressure difference.

* * * * *